United States Patent [19]

Bharucha et al.

[11] 4,087,561

[45] May 2, 1978

[54] CONTROL OF NITROSAMINE FORMATION IN NITRITE CURED MEAT WITH 1,2,3,4-TETRAHYDRO-QUINOLINE COMPOUNDS

[75] Inventors: Kekhusroo R. Bharucha, Toronto, Canada; Michael H. Coleman, Putnoe, England

[73] Assignees: Canada Packers Limited, Toronto, Canada; Unilever Limited, London, England

[21] Appl. No.: 643,558

[22] Filed: Dec. 22, 1975

[51] Int. Cl.² .............................................. A23B 4/02
[52] U.S. Cl. ................................... 426/266; 426/332; 426/281; 426/302; 426/641; 426/652; 426/654
[58] Field of Search ............... 426/331, 601, 641, 645, 426/652, 654, 281, 302, 265, 266, 332, 264; 260/289 R

[56] References Cited

U.S. PATENT DOCUMENTS

| 2,553,533 | 5/1951 | Komarik et al. ...................... 426/265 |
| 2,828,212 | 3/1958 | Sair .................................... 426/266 X |
| 3,052,560 | 9/1962 | Delaney ............................. 426/652 X |
| 3,154,421 | 10/1964 | Voegeli et al. .................. 426/652 X |
| 3,901,981 | 8/1975 | Draudt ............................. 426/645 X |

FOREIGN PATENT DOCUMENTS 572,948   3/1959   Canada ............................ 260/289 R

*Primary Examiner*—Raymond N. Jones
*Assistant Examiner*—Esther M. Kepplinger
*Attorney, Agent, or Firm*—Bacon & Thomas

[57] ABSTRACT

The formation of nitrosamines in cooked, cured meat products is reduced or eliminated by using certain 1, 2, 3, 4-tetrahydro-6-alkoxyquinoline compounds in the curing mixtures or to treat the cured meat.

24 Claims, No Drawings

CONTROL OF NITROSAMINE FORMATION IN NITRITE CURED MEAT WITH 1,2,3,4-TETRAHYDRO-QUINOLINE COMPOUNDS

CO-PENDING APPLICATIONS

This application is related to co-pnding application Ser. No. 632,793 filed on Nov. 17, 1975 by Michael Herder Coleman.

BACKGROUND OF THE INVENTION

This invention relates to control of nitrosamine formation in nitrite cured meat.

Cured meat products have been prepared for many years by treatment of fresh meat with an alkali metal nitrite-containing composition or with a composition containing a mixture of alkali metal nitrite and an alkali metal nitrate. Sodium chloride is generally present in the curing mixture and other materials such as sugar may also be present. Spices may be added. Ascorbic acid, isoascorbic acid (sometimes called erythorbic acid) or salts of ascorbic acid or isoascorbic acid are sometimes used to accelerate the formation of cured meat pigments.

The conventional alkali metal nitrite or nitrate-nitrite containing curing mixtures provide quite satisfactory cures insofar as cured-meat preservation, flavor, and development of the pink to red color characteristic of cured meats are concerned. Nitrates were at one time used alone and then one had to depend on bacterial action for their conversion to nitrites during the curing process. No practical substitute for the nitrite ion in the curing process has yet been discovered.

Unfortunately, minute amounts of undesirable nitrosamines may occur in meats, particularly bacon, which have been cured with the conventional curing mixtures, and which have been cooked by methods in which the fats reach relatively high temperatures. For example, N-nitrosopyrrolidine and dimethylnitrosamine are found on frying bacon, the cook-out fat containing the largest proportion of these volatile nitrosamines with N-nitrosopyrrolidine being present in the greater amount. These nitrosamines are not found in the cured raw meats. Apparently, the temperature attained by the fats in frying or equivalent cooking processes, such as broiling, grilling, microwave heating, etc., facilitates the reaction of alkali metal nitrites and amines of the meat to form nitrosamines. Since N-nitrosopyrrolidine and dimethylnitrosamine have been found to be carcinogenic in tests on experimental animals, they are regarded as a potential hazard in human food products. It is desirable, therefore, to reduce, eliminate or prevent the formation of these substances in cooked meat products. It is disclosed in the afore-mentioned application Ser. No. 632,793 that 1,2-dihydro-6-alkoxyquinolines, e.g. ethoxyquin, a known food antioxidant, are useful for this purpose.

SUMMARY OF THE INVENTION

The present invention provides meat treating compositions and methods of treating nitrite cured meat which make use of a small quantity of a 1,2,3,4-tetrahydro-6-alkoxyquinoline compound to reduce or eliminate the nitrosamines which are generated when nitrite cured meat is cooked at the usual high temperatures attained during frying, grilling or broiling. We have discovered that, when a small amount of a compound of the class described is included in the curing mixtures or is otherwise applied to the meat before cooking, the proportion of undesirable nitrosamines contained in the meat after cooking is drastically reduced and in some instances virtually eliminated.

It is therefore an object of the invention to provide meat curing compositions and methods which reduce or eliminate the formation of undesirable nitrosamines during subsequent cooking of the cured meat.

It is another object of the invention to provide a composition and method for curing bacon which reduces or eliminates the formation of undesirable nitrosamines in the bacon during the subsequent frying or equivalent cooking process.

A further object of the invention is to provide a nitrite cured meat product in which formation of undesirable nitrosamines during cooking is minimized.

DETAILED DESCRIPTION

The invention is based on the discovery that 6-alkoxyquinolines which are saturated in the nitrogen-containing ring, e.g., 1,2,3,4-tetrahydro-6-alkoxyquinolines, provide a high degree of control over formation of undesirable nitrosamines in nitrite cured meat. Since the mechanism by which compounds interfere with the formation of nitrosamines at high temperature is obscure, this result was unexpected. For example, the indole analogue of ethoxyquin (wherein the nitrogen-containing ring is five membered) in our experience has little or no effect in inhibiting nitrosamine formation in nitrite cured meat.

The 1,2,3,4-tetrahydro-6-alkoxyquinolines possess properties which render their use more advantageous than that of the corresponding 1,2-dihydro-6-alkoxyquinoline compounds. They are more stable than their unsaturated counterparts. For example, ethoxyquin is an oily, yellow liquid which rather quickly turns dark in the presence of air. The saturated analogue, 1,2,3,4-tetrahydro-2,2,4,-trimethyl-6-ethoxyquinoline, on the other hand can be prepared in the form of a crystalline solid which is quite stable at room temperature. Nevertheless, this compound is equally effective in the control of nitrosamines in nitrite cured meats as the compound ethoxyquin.

It will be understood that use of the 1,2,3,4-tetrahydro-6-alkoxyquinolines in crude form in which they may exist as oils as well as in solid more highly purified form is within the scope of the invention, the solid materials, in general, being preferred. The compounds are fat soluble and therefore may be readily incorporated in meat products.

The 6-alkoxy-1,2,3,4-tetrahydroquinolines which are suitable for practice of the invention include but are not necessarily limited to those defined by the following formula:

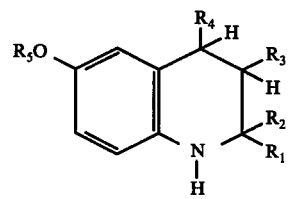

wherein:

$R_1$, $R_2$, $R_3$ and $R_4$, which may be the same or different, are selected from the group consisting of hydrogen and alkyl of one to six carbon atoms, preferably one to four carbon atoms, and $R_5$ is alkyl of one to 12 carbon atoms, preferably one to four carbon atoms. Inert substituents, such as alkyl, may also be present in lieu of hydrogen on the carbon atoms of either ring.

Representative Compounds Are As Follows:
(a) 1,2,3,4-tetrahydro-2,2,4-trimethyl-6-ethoxyquinoline,
(b) 1,2,3,4-tetrahydro-2,2,4-trimethyl-6-methoxyquinoline,
(c) 1,2,3,4-tetrahydro-2,2,4-trimethyl-6-isopropoxyquinoline,
(d) 1,2,3,4-tetrahydro-2,2,4-trimethyl-6-n-propoxyquinoline,
(e) 1,2,3,4-tetrahydro-2,2,4-trimethyl-6-n-butoxyquinoline,
(f) 1,2,3,4-tetrahydro-2,2,4-trimethyl-6-n-hexyloxyquinoline,
(g) 1,2,3,4-tetrahydro-2,4-diethyl-2-methyl-6-methoxyquinoline,
(h) 1,2,3,4-tetrahydro-2,4-diethyl-2-methyl-6-ethoxyquinoline,
(i) 1,2,3,4-tetrahydro-2,4-di-isopropyl-2-methyl-6-ethoxyquinoline,
(j) 1,2,3,4-tetrahydro-2,4-di-n-butyl-2-methyl-6-ethoxyquinoline,
(k) 1,2,3,4-tetrahydro-2,2,4-trimethyl-6-amyloxyquinoline,
(l) 1,2,3,4-tetrahydro-2,2,4-trimethyl-6-dodecyloxyquinoline,
(m) 1,2,3,4-tetrahydro-2-n-propyl-3-ethyl-6-ethoxyquinoline,
(n) 1,2,3,4-tetrahydro-2-ethyl-2,3,4-trimethyl-6-methoxyquinoline,
(o) 1,2,3,4-tetrahydro-2,4-dimethyl-2-isobutyl-6-ethoxyquinoline,
(p) 1,2,3,4-tetrahydro-6-methoxyquinoline.

The compounds of the invention do not significantly affect the nitrosyl pigments of the cured meat, and so do not appreciably affect its color. Additionally, the compounds do not materially change the nitrite content of the raw cured meat products, and thus do not impair its anti-bacterial action. The mechanism by which the 1,2,3,4-tetrahydro-6-alkoxyquinolines interfere with the formation of nitrosamines at high temperature is not completely understood. However, the invention is not limited by any particular theory of operation. It has been shown by a series of tests with representative compounds that up to 100% of the nitrosamines which normally appear in fried bacon have been eliminated.

PREPARATION OF COMPOUNDS

The compounds utilized by the invention as defined by the structural formula above are either commercially available or are readily obtainable by any of a number of known chemical procedures. Preparation of representative compounds (a) through (l) from the corresponding 1,2-dihydro-6-alkoxyquinoline compounds by hydrogenation in the presence of a nickel catalyst has been described in U.S. Pat. No. 2,846,435. We have prepared compounds (a), (g), (h), and (o) by hydrogenation of the corresponding 1,2-dihydro-6-alkoxyquinoline compound in the presence of a palladium/carbon catalyst. The 1,2-dihydro-6-alkoxyquinoline starting materials may be obtained commercially, as in the case of 1,2-dihydro-2,2,4-trimethyl-6-ethoxyquinoline (ethoxyquin) or may be prepared by condensation of aniline or a substituted aniline with a carbonyl compound such as acetone, methyl ethyl ketone, methyl isobutyl ketone and butyraldehyde, in the presence of a catalyst such as iodine, p-toluenesulphonic acid or sulphanilic acid, as described, for example, in U.S. Pat. No. 3,829,292.

Compositions and Methods of Application

The 1,2,3,4-tetrahydro-6-alkoxyquinoline compound is introduced into nitrite cured meat in any convenient manner so as to provide an amount in the cured meat which is effective to reduce the nitrosamine content of the meat treated by the compound and cooked at frying temperature. In general, the compound is applied in a brine solution which is used to cure the meat or is applied after cure in solution in a suitable solvent to the surface of the cured meat. Combinations of both methods may be used.

The optimum amount of the compound to be incorporated in the meat may vary to some extent from one compound of the general formula to another. In general, the useful range is from about 1 to 200 ppm (parts per million) on a weight basis of active compound to cured meat, with a preferred range being from about 10 to 100 ppm. The quantity of the active compound in the meat is extremely low but nevertheless is effective to materially reduce or eliminate the known nitrosamines of cooked cured meat products. The meat itself enjoys all of the advantages of the nitrite cure with respect to colour, flavor and protection against bacterial action.

A typical embodiment of the invention will now be described. A meat curing solution, also known as a pickle solution, is prepared in the usual manner.

The quantities of the various ingredients in the pickle solution can be varied widely depending on the meat to be cured and the type of cure. Typically, the curing solution may contain on a weight basis, in addition to water and nitrite salt sufficient to provide from about 10 to 200 ppm of free nitrite in the meat, from about 5 to 25% NaCl, from about 4 to 12% of sugars, e.g. sucrose and dextrose, from 0.1 to 5% ascorbate or isoascorbate. In accordance with the present invention, from about 0.001 to 0.2% of 1,2,3,4-tetrahydro-6-alkoxyquinoline compound is also incorporated in this curing solution, preferably with the aid of from about 0.01 to 0.5% of an edible emulsifying agent.

Any suitable edible emulsifying agent that will facilitate the dispersion of the 1,2,3,4-tetrahydro-6-alkoxyquinoline compound in water may be used. Representative examples of emulsifying agents are the polyoxyalkylene derivatives of hexitol anhydride partial long chain fatty acid esters, known under the "Tween" trademark. However, the invention is not limited to the use of these representative substances.

The solution is then incorporated into the meat to be cured in any conventional manner, e.g., by soaking or injection. A combination of these procedures can be used. Thus, the meat can be soaked in the pickle solution for a sufficient time to permit diffusion of the solution throughout the meat. Alternatively, the pickle solution can be pumped through the vascular system of the meat cut or injected directly into the muscle by use of a plurality of needles. After pumping or injection, the meat cut may be given a soaking period in the pickle solution. In the case of bacon, the amount of pickle solution incorporated in the meat may be in the order of about 10%, and in the case of hams may be about 18%. However, these amounts are subject to wide variations at the choice of the processor.

In the processing of bacon, hams and the like, after incorporation of the picle solution, the meat may be subjected to a conventional heating and/or smoking step. Typically, bacon is heated in this step to an internal temperature of about 55° C. and larger cuts such as hams to an internal temperature of about 67° C..

In another embodiment of the invention, a solution or dispersion of the 1,2,3,4-tetrahydro-6-alkoxyquinoline compound may be applied to the meat after curing, e.g. a solution of the selected compound in a suitable liquid solvent medium may be sprayed or brushed on slices of the cured meat prior to packaging. Suitable liquids include edible oils as well as vaporizable solvents such as the lower aliphatic alcohols, e.g. ethanol and isopropanol. In general, concentrations of about 1 to 10% of the 1,2,3,4-tetrahydro-6-alkoxyquinoline compound in the liquid medium are used. These compositions are applied to the meat surfaces in amounts to provide from about 1 to 200 ppm based on the weight of the cured meat.

The invention can also be applied in the production of bacon by slice-cure procedures, such as that described in U.S. Pat. No. 2,974,047.

It can very conveniently be applied in a bacon-curing procedure in which sliced frozen pork is enclosed in a pack with brine containing an amount of nitrite such as will leave free nitrite, suitably in an amount forming 10–200 ppm of the meat, after the formation of the desired bacon colour; and the pack is sealed in vacuo and the cure is allowed to proceed, suitably by storage at room temperature. The salt content of bacon cured by this procedure, as of bacon cured by the known procedures, is usually in the range of 3–10% sodium chloride weight/weight of aqueous phase of the cured meat.

The invention can also be applied to the reduction of nitrosamine-forming capacity in other cured meat products, either beef or pork, including corned beef, wieners and bologna.

EXAMPLES OF PRACTICE

The invention will be further illustrated by the following examples of practice:

Example 1

1,2,3,4-Tetrahydro-2,2,4-trimethyl-6-ethoxyquinoline

Commercial ethoxyquin in the form of an oily liquid (20g) was dissolved in ethanol (50ml) in a pressure vessel. Pd/C (10%, 1.4g) was added with another 50 ml of ethanol. The mixture was hydrogenated at 50 psi at room temperature for 3½ hours. The catalyst was removed by filtration through double filter paper under vacuum. Removal of the ethanol from the filtrate in vacuum gave a crude dark brown product (20g). The crude product was distilled at 0.5 mm pressure. The fraction boiling at 104°–105° C. was collected yielding 12.2g of pale yellow liquid which solidified on standing at room temperature to provide the desired solid product. It was crystallized from hexane and had m.p. 49°–51° C..

Analysis: Found: C, 76.87; H, 9.74; O, 7.55%. $C_{14}H_{20}NO$ requires: C, 77.02; H, 9.23; O, 7.32%.

A portion of the foregoing product was dissolved in winterized soya oil to provide a 4.5% concentration and the resulting solution was streaked on bacon slices, which had undergone a conventional nitrite cure and plant processing, in quantities providing levels of 1,2,3,4-tetrahydro-2,2,4-trimethyl-6-ethoxyquinoline of from 5 ppm to 100 ppm in the meat. Control slices of bacon were streaked with the oil alone. The bacon slices were fried under standardized conditions and the cook-out fat was analyzed for volatile nitrosamine content. The results are shown in the following Table:

TABLE I

Control of Nitrosamine Content of Fried Bacon Using 1,2,3,4-tetrahydro-2,2,4-trimethyl-6-ethoxyquinoline.

| Sample No. | Amount of Test Compound in Meat (ppm) | Nitrosamines In Cook-Out Fat (ppb)* | |
|---|---|---|---|
| | | Test Product | Control Product |
| 1 | 100 | 0 | 29 |
| 2 | 80 | 2 | 19 |
| 3 | 40 | 3 | 19 |
| 4 | 20 | 1 | 19 |
| 5 | 10 | 0 | 19 |
| 6 | 10 | 2 | 18 |
| 7 | 5 | 5 | 19 |
| 8 | 20 | 0 | 31 |
| 9 | 10 | 10 | 31 |
| 10 | 5 | 22 | 31 |
| 11 | 20 | 5 | 36 |
| 12 | 10 | 8 | 36 |
| 13 | 5 | 6 | 36 |
| 14 | 100 | 1 | 49 |
| 15 | 20 | 3 | 39 |
| 16 | 10 | 15 | 39 |
| 17 | 20 | 2 | 25 |
| 18 | 10 | 4 | 25 |

*(ppb) parts per billion

Since the analytical means available are not accurate below about 3 ppb (parts per billion), it will be seen that at levels of about 20 parts per million and greater of the test compound in the meat the amount of nitrosamines in the cook-out fat was reduced below the accurately determinable level. Lesser amounts of the test compound resulted in a significant reduction in the amount of nitrosamines formed, in some instances reducing the nitrosamines below the accurately detectable level. Since the fat resulting from fried, cured meat invariably contains the major portion of the nitrosamines formed during the frying, it has been demonstrated that the nitrosamine content of the fried meat has been virtually eliminated by use of the compound of the invention.

Example 2

1,2,3,4-Tetrahydro-2,4-diethyl-2-methyl-6-methoxyquinoline (a) 1,2-Dihydro-2,4-diethyl-2-methyl-6-methoxyquinoline: A mixture of p-anisidine (25.0g), iodine (0.5g), and ethylene dichloride (1ml) in methylethylketone (ca 150ml) was refluxed for 26 hours under exclusion of moisture so that the condensing vapours were passed through #3A molecular sieves before returning to the reaction vessel. After 17 hours, the mixture was allowed to come to dryness in vacuo. The residue (26g) was distilled in vacuo to give several fractions (brown oils) the fraction boiling at 120°–150° C. (1–0.8mm) was partly solid and weighed 5.31 grams. It was dissolved in methylene chloride, washed with dilute HCl and then neutralized with sodium bicarbonate solution, washed once with water, dried over anhydrous sodium sulphate and evaporated to dryness in vacuo. A brown oil (4.26g) was obtained. The oil was dissolved in benzene and chromatographed on silica gel (200g). First 800 ml of benzene eluates were discarded. The fraction eluting with subsequent 3750 ml of benzene was a brown oil (2.59g), and was the crude desired product.

(b) 1,2,3,4-Tetrahydro-2,4-diethyl-2-methyl-6-methoxyquinoline: The above crude product (2.35g) in absolute ethanol (20ml) was treated with 10% Pd/C (400mg) and hydrogenated in a pressure vessel until the uptake of hydrogen ceased. The catalyst was then filtered off and the filtrate evaporated to dryness in vacuo to provide the title compound as a brown gum. The structure was supported by nmr spectrum.

A portion of the 1,2,3,4-tetrahydro-2,4-diethyl-2-methyl-6-methoxyquinoline prepared as above was dissolved in winterized soya oil (4.5% concentration) and the resulting solution was streaked on nitrite cured, plant processed bacon slices at a level of 100 ppm in the meat. Control slices of bacon received oil alone. The bacon slices were fried and the cook-out fat was analyzed for volatile nitrosamine content as in Example 1. The results were as follows:

TABLE II

Control of Nitrosamine Content of Fried Bacon Using 1,2,3,4-tetrahydro-2,4-diethyl-2-methyl-6-methoxyquinoline.

| Sample No. | Amount of Test Compound in Meat (ppm) | Nitrosamines In Cook-Out Fat (ppb) | |
|---|---|---|---|
| | | Test Product | Control Product |
| 1 | 100 | 2 | 51 |
| 2 | 100 | 0 | 15 |

It will be seen that for each test sample the nitrosamine content of the cook-out fat has been reduced below the accurately detectable level (3 ppb). It follows that the fried meat would be virtually free of such substances.

Example 3

1,2,3,4-Tetrahydro-6-methoxyquinoline

6-Methoxyquinoline (1.00g) was dissolved in absolute ethanol (20 ml) and hydrogenated under pressure in the presence of 10% palladium on charcoal (0.10g) with shaking for about 40 hours. Filtration and evaporation to dryness of the filtrate gave 1,2,3,4-tetrahydro-6-methoxyquinoline as a light-brown gum (0.97g). The structure was supported by nmr spectrum.

This compound is utilized for control of nitrosamine formation in nitrite cured meat by the procedures described above. When tested at the level of 100 ppm on bacon slices as in the preceding examples, the cook-out fat from the test sample showed 0.6 ppb nitrosamine content whereas the cook-out fat from the control sample showed 15 ppb nitrosamine.

Example 4

1,2,3,4-Tetrahydro-2,4-diethyl-2-methyl-6-ethoxyquinoline

A mixture of p-phenetidine (30.0g), iodine (0.5g), ethylene dichloride (1 ml) and methylethylketone (200 ml) was refluxed for 12 hours in a soxhlet extractor charged with molecular sieves 3A to trap water. Protection from atmospheric moisture was provided.

The reaction mixture was concentrated to a small volume in vacuo and then shaken with a hexane-water mixture in a separatory funnel; the organic layer was evaporated to dryness, and fractionated in vacuo. Fractions (18.4g) with b.p.≧141° C/0.5–1.0 mm. were collected. A portion (16.9g) of this material was chromatographed on silica gel (320g) with benzene. After elution of initial 0.63 l., 1,2-dihydro-2-methyl-2,4-diethyl-6-ethoxyquinoline was eluted in the following 1.40 l. as a brown gum (6.1g).

A portion (1.00g) dissolved in absolute ethanol (20 ml), together with 10% palladium on charcoal (0.16g) as catalyst was shaken under hydrogen pressure of 50 psi for 1.5 hours. Filtration and evaporation to dryness of the filtrate gave 1,2,3,4-tetrahydro-2,4-diethyl-2-methyl-6-ethoxyquinoline (1.00g) as a light-brown gum. The structure was supported by nmr spectrum.

This compound is likewise used for control of nitrosamine formation in nitrite cured meat by the procedures described above. When tested at the level of 100 ppm on bacon slices as in the preceding examples, the cook-out fat from the test sample showed zero nitrosamine content whereas the cook-out fat from the control sample showed 15 ppb nitrosamines.

Example 5

1,2,3,4-Tetrahydro-2,4-dimethyl-2-isobutyl-6-ethoxyquinoline

A mixture of p-phenetidine (25.0g), iodine (0.5g), ethylene dichloride (1 ml) and methylisobutylketone (~200 ml) was refluxed in a Soxhlet extractor, charged with molecular sieves 3A, for 16 hours. A moisture trap was attached to the condenser. On cooling to room temperature a solid was filtered off and discarded. The filtrate was distilled at 0.5 mm. Fractions boiling above 90° C. were combined and re-distilled; a fraction, distilling at 100°–110° C. (0.7 mm) was collected as a yellow oil (6.0g). NMR spectrum indicated it to be the Schiff base from p-phentidine and methylisobutyl ketone.

A portion (5.98g) of this material, 4-methyl-2-pentanone p-ethoxyphenylimine, combined with iodine (0.15g), ethylene dichloride (0.5 ml) and acetone (200 ml), was refluxed for about 26 hours in a Soxhlet extractor, which was charged with molecular sieves 3A and fitted with a moisture trap at the condenser outlet. The product was evaporated to dryness in vacuo and then fractionated. Fractions with b.p.≧120° C/0.5 mm were combined and the brown oil (3.26lg) was chromatographed on silica gel (180g, mesh 70–230). Benzene (2 l.) and benzene-chloroform (9:1, 1.5 l.) eluates furnished 1,2-dihydro-2,4-dimethyl-2-isobutyl-6-ethoxyquinoline as a brown oil (1.88g).

A portion (1.00g) was dissolved in absolute ethanol (20 ml), treated with 5% palladium on charcoal (0.20g) and hydrogenated with shaking under initial hydrogen pressure of 50 psi overnight. Filtration and evaporation of the filtrate to dryness left the title compound as a brown gum (0.91g). The structure was supported by nmr spectrum.

This compound is also utilized in the control of nitrosamine formation in nitrite cured meat by the procedures described above. When tested at the level of 100 ppm on bacon slices as in the preceding examples, the cook-out fat from the test sample showed 0.6 ppb nitrosamine content, whereas the cook-out fat from the control sample showed 15 ppb nitrosamine.

Similarly, other compounds of the general formula may be prepared and used for nitrosamine control in nitrite cured meat.

Example 6

This example is representative of the use of compounds of the general formula given above in a pumping pickle.

A single pork belly (13.2 lb) was cut along the short dimension into two equal portions. Production pickle (300g), of a composition which has been generally described above, was pumped into one portion to be used as control. The other half was pumped with the same production pickle (300g) to which 1,2,3,4-tetrahydro-2,2,4-trimethyl-6-ethoxyquinoline, prepared as described in Example 1, (150 mg = 50 ppm) in Tween 60 (500 mg) had been dispersed. Both portions were subsequently smoked, chilled, sliced, and packaged normally. The samples were then analyzed for nitrite content. The amount of nitrite found just before frying was 75 ppm in the control sample and 73 ppm in the test sample.

Each sample of the bacon was then fried under standard frying conditions and the cook-out fat analyzed for volatile nitrosamines. The control sample was found to contain 21 ppb nitrosamine while the test sample did not show any detectable nitrosamine.

Similarly, other 1,2,3,4-tetrahydro-6-alkoxyquinoline compounds of the general formula given above may be utilized in pumping pickles for control of nitrosamine formation in nitrite cured meat. It will be understood that the examples are for purposes of illustration only and that the compounds are likewise effective when incorporated in the meat by other methods as described herein.

The embodiments of the invention in which an exclusive property or privilege is claimed are defined as follows:

1. A meat treating composition comprising a solution or dispersion of a 1,2,3,4-tetrahydro-6-alkoxyquinoline compound, wherein the alkoxy group contains from 1 to 12 carbon atoms, in a nitrite-containing meat curing solution, the amount of said compound in said composition being effective to reduce the formation of nitrosamines in nitrite cured meat treated by said composition and cooked at frying temperature.

2. The meat treating composition of claim 1 wherein the compound has the following formula:

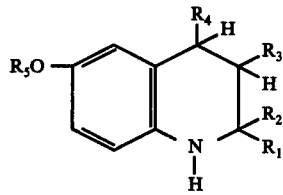

wherein:
$R_1$, $R_2$, $R_3$ and $R_4$ may be the same or different, and each are selected from the group consisting of hydrogen and alkyl group of from 1 to 6 carbon atoms, and $R_5$ is an alkyl group of from 1 to 12 carbon atoms.

3. The meat treating composition of claim 1 wherein the compound is 1,2,3,4-tetrahydro-2,2,4-trimethyl-6-ethoxyquinoline.

4. The meat treating composition of claim 1 wherein the compound is 1,2,3,4-tetrahydro-2,4-diethyl-2-methyl-6-methoxyquinoline; 1,2,3,4-tetrahydro-2,4-diethyl-2-methyl-6-ethoxyquinoline; 1,2,3,4-tetrahydro-2,4-dimethyl-2-isobutyl-6-ethoxyquinoline; or, 1,2,3,4-tetrahydro-6-methoxyquinoline.

5. The meat treating composition of claim 1 wherein the meat curing solution is an aqueous solution and the compound is dispersed in said solution with the aid of an edible emulsifying agent.

6. The meat treating composition of claim 5 wherein the compound is present in the solution in an amount of about 0.001% to 0.2% based on the weight of the solution.

7. A composition for the curing of meats comprising an aqueous curing solution containing sodium chloride, a sugar, an alkali metal nitrite curing salt and from about 0.001 to 0.2% by weight of 1,2,3,4-tetrahydro-2,2,4-trimethyl-6-ethoxyquinoline.

8. A process for nitrosamine control in nitrite cured meats comprising treating the meat during or after the nitrite cure with an effective amount of a 1,2,3,4-tetrahydro-6-alkoxyquinoline compound, in which the alkoxy group contains from 1 to 12 carbon atoms, to reduce the quantity of nitrosamines formed when the cured meat is cooked at frying temperature.

9. The process of claim 8 wherein the compound has the following formula:

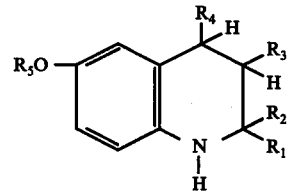

wherein:
$R_1$, $R_2$, $R_3$ and $R_4$ may be the same or different and each are selected from the group consisting of hydrogen and an alkyl group of from 1 to 6 carbon atoms, and $R_5$ is an alkyl group of from 1 to 12 carbon atoms.

10. The process of claim 9 wherein the compound is applied to the meat in an amount such that the cured meat contains from about 1 to 200 parts by weight of the compound per million parts by weight of the meat.

11. The process of claim 9 wherein the compound is 1,2,3,4-tetrahydro-2,2,4-trimethyl-6-ethoxyquinoline and is applied to the meat in an amount such that the cured meat contains from about 10 to 100 parts by weight of the compound per million parts be weight of the meat.

12. The process of claim 9 wherein the compound is 1,2,3,4-tetrahydro-2,4-diethyl-2-methyl-6-methoxyquinoline; 1,2,3,4-tetrahydro-2,4-diethyl-2-methyl-6-ethoxyquinoline; 1,2,3,4-tetrahydro-2,4-dimethyl-2-isobutyl-6-ethoxyquinoline; or, 1,2,3,4-tetrahydro-6-methoxyquinoline.

13. The process of claim 9 wherein the compound is dispersed in a nitrite curing solution and the solution is injected into the meat.

14. The process of claim 9 wherein the compound is dissolved in a liquid solvent medium and the solution is applied to surfaces of sliced cured meat.

15. The process of claim 9 wherein the meat is a pork cut for production of bacon.

16. The process of claim 14 wherein the meat is sliced bacon.

17. A process for the curing of bacon so as to reduce the quantity of nitrosamines formed when the cured bacon is subjected to frying temperatures, comprising curing said bacon with a nitrite curing solution containing an amount of a 1,2,3,4-tetrahydro-6-alkoxyquinoline compound, wherein the alkoxy group contains from 1-12 carbon atoms, sufficient to provide from about 1 to 200 parts of the compound per million parts of the meat.

18. The process of claim 17 wherein the compound is 1,2,3,4-tetrahydro-2,2,4-trimethyl-6-ethoxyquinoline.

19. A process for the control of nitrosamine formation during cooking of nitrite cured bacon comprising applying to slices of the cured bacon an edible oil solution of a 1,2,3,4-tetrahydro-6-alkoxyquinoline compound, wherein the alkoxy group contains from 1-12 carbon atoms, said solution being applied to the bacon slices in an amount sufficient to provide from about 1 to 200 parts by weight of the said compound per million parts by weight of meat.

20. The process of claim 19 wherein the compound is 1,2,3,4-tetrahydro-2,2,4-trimethyl-6-ethoxyquinoline.

21. A nitrite cured meat product containing from about 1 to 200 parts by weight per million parts of the meat of a compound of the formula:

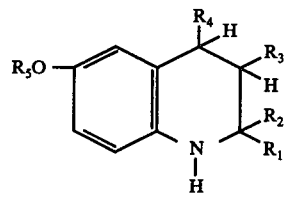

wherein:
$R_1$, $R_2$, $R_3$ and $R_4$ are the same or different and each are selected from the group consisting of hydrogen and alkyl of from 1 to 6 carbon atoms, and
$R_5$ is an alkyl group of from 1 to 12 carbon atoms.

22. The product of claim 21 wherein the nitrite cured meat is bacon.

23. The product of claim 21 wherein the compound is 1,2,3,4-tetrahydro-2,2,4-trimethyl-6-ethoxyquinoline.

24. The product of claim 21 wherein the compound is 1,2,3,4-tetrahydro-2,4-diethyl-2-methyl-6-methoxyquinoline; 1,2,3,4-tetrahydro-2,4-diethyl-2-methyl-6-ethoxyquinoline; 1,2,3,4-tetrahydro-2,4-dimethyl-2-isobutyl-6-ethoxyquinoline; or, 1,2,3,4-tetrahydro-6-methoxyquinoline.

* * * * *